US008566741B2

(12) United States Patent
Danton et al.

(10) Patent No.: US 8,566,741 B2
(45) Date of Patent: Oct. 22, 2013

(54) INTERNAL SCROLL ACTIVATION AND CURSOR ADORNMENT

(75) Inventors: Stephen M. Danton, Seattle, WA (US); Florian Voss, Seattle, WA (US); Arwen E. Pond, Woodinville, WA (US); James R. Flynn, Seattle, WA (US); Laurent Mollicone, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 12/202,086

(22) Filed: Aug. 29, 2008

(65) Prior Publication Data
US 2010/0058227 A1 Mar. 4, 2010

(51) Int. Cl.
*G06F 3/14* (2006.01)

(52) U.S. Cl.
USPC .......... 715/786; 715/784; 715/848; 345/159; 345/419; 345/641

(58) Field of Classification Search
USPC .......... 715/200–277, 700–867; 700/701–866; 709/201–229; 705/50–79; 345/30–111
See application file for complete search history.

(56) References Cited

U.S. PATENT DOCUMENTS

| | | | |
|---|---|---|---|
| 5,172,102 A | 12/1992 | Iwamura et al. | |
| 5,263,134 A * | 11/1993 | Paal et al. | 715/788 |
| 5,568,603 A * | 10/1996 | Chen et al. | 715/784 |
| 5,655,094 A | 8/1997 | Cline et al. | |
| 5,734,805 A * | 3/1998 | Isensee et al. | 345/419 |
| 5,838,320 A | 11/1998 | Matthews, III et al. | |
| 5,900,872 A | 5/1999 | Ashe | |
| 6,014,142 A * | 1/2000 | LaHood | 715/848 |
| 6,069,626 A * | 5/2000 | Cline et al. | 715/786 |
| 6,259,432 B1 * | 7/2001 | Yamada et al. | 345/159 |
| 6,285,347 B1 | 9/2001 | Watanabe et al. | |
| 7,328,411 B2 | 2/2008 | Satanek | |
| 7,958,455 B2 * | 6/2011 | Doar | 715/784 |
| 2003/0052902 A1 | 3/2003 | Yu | |
| 2004/0107043 A1 | 6/2004 | de Silva | |
| 2005/0024238 A1 | 2/2005 | Kimura | |
| 2006/0139375 A1 * | 6/2006 | Rasmussen et al. | 345/641 |
| 2008/0155462 A1 * | 6/2008 | Nilakantan et al. | 715/786 |

FOREIGN PATENT DOCUMENTS

| | | |
|---|---|---|
| EP | 0493990 | 7/1992 |
| JP | 09-152856 | 6/1997 |
| JP | 2000-010693 | 1/2000 |
| JP | 2005-267630 | 9/2005 |

OTHER PUBLICATIONS

Adobe, "Adobe Acrobat 7.0 Professional", Sep. 23, 2005, Adobe Systems Incorporated, Version 7.0.5 snapshots of working program, p. 1-5.*

(Continued)

*Primary Examiner* — Ruay Ho
(74) *Attorney, Agent, or Firm* — Workman Nydegger

(57) ABSTRACT

Mechanisms for allowing a user to scroll through a displayed viewer. Upon detected using input while the viewer is being displayed, the user input is identified is being a scrolling gesture. In response, a scrolling control is activated at an interior portion of the displayed viewer. In addition, when the user navigates the cursor to within a scrollable display, the cursor is adorned with a scrolling context emblem that represents scrolling options available for that viewer.

15 Claims, 8 Drawing Sheets

(56) References Cited

OTHER PUBLICATIONS

Mouse Assisted Scrolling Function for Multimedia Displays (2 pages) http://www.priorartdatabase.com/IPCOM/000114442/ (Jul. 28, 2008).

A Scrollbar-based Visualization for Document Navigation, Copyright 1999, (8 pages), http://delivery.acm.org/10.1145/320000/313283/p122-byrd.pdf?Key1=313283&key2=5791327121&coll=Guide&dl=GUIDE&CFID=38485842&CFTOKEN=91318740.

* cited by examiner

INTERNAL SCROLL ACTIVATION AND CURSOR ADORNMENT

BACKGROUND

Content is often displayed in a computing system within a window or viewer. When that viewer is smaller that the content, one or more scrollbars may appear along the sides of the viewer. For instance, if the content is taller than the viewer, a vertical scrollbar will appear at the right or left side of the viewer allowing the user to scroll up and down through the content. Alternatively or in addition, if the content is wider than the viewer, a horizontal scrollbar will appear at the upper or lower side of the viewer, allowing the user to scroll right or left through the content.

A scroll bar typically includes four essential components; two arrow controls, a track, and a thumb. For vertical scrollbars, there is an up-arrow at the top of the scrollbar and a down-arrow at the bottom of the scrollbar. For horizontal scrollbars, there is a left-arrow at the left of the scrollbar and a right-arrow at the right of the scrollbar. The track extends between the two arrow controls. The length of the track represents the entire extent of the content in the scrollable direction served by the scrollbar. The thumb is a rectangular control that may be slid along the track in order to move through the content in the scrollable direction served by the scrollbar the length of the thumb in the direction of the track in proportion to the entire length of the track represents that proportion of the content that is currently displayed. The position of the thumb within the track represents the relative position of the currently viewed portion of the content with respect to the entire extent of the content in the scrollable direction served by the scrollbar.

Such scrollbars are typically always present in the viewer and occupy viewer space so long as the content being displayed is larger than the viewer. Furthermore, if there are several layers of nested viewers, there may be likewise be nested scrollbars since each viewer may have one or more scrollbars. In order to scroll within the appropriate viewer, the user should find the appropriate scrollbar amongst multiple nested scroll bars.

In order to use a scrollbar, a user moves the cursor from wherever it is, to the appropriate navigation controls within the appropriate scroll bar. If the user is to change the type of scrolling to be performed, further cursor movement might be needed. For instance, if one is using the down-arrow to scroll downward, and the user is now to scroll upwards, the user moves the cursor up from the down-arrow control to select the up-arrow control, or clicks on the scroll bar above where the thumb is displayed. The scroll wheel is one advancement that provides further efficiency by not requiring that the mouse be within the confines of the scrollbar in order to operate the scrollbar. However, the scroll wheel is often used for multiple purposes such as scrolling and zooming, making it sometimes ambiguous to the user as to what the scroll wheel will do in a given context.

BRIEF SUMMARY

Embodiments described herein related to mechanism for allowing a user to scroll through a displayed viewer. Upon detected using input while the viewer is being displayed, the user input is identified is being a scrolling gesture. In response, a scrolling control is activated at an interior portion of the displayed viewer. In one embodiment, the scrolling control is displayed at approximately the portion of the viewer that the cursor was positioned at when the user input gesture was detected. The scrolling control allows the user to scroll the viewer in the scrollable direction of the viewer. In one embodiment, the user input gesture is a dragging operation, and the dragging operation that led to the activation of the scrolling control may lead continuously into a dragging operation used to manipulate of the scrolling control.

In another embodiment, when the user navigates the cursor to within a scrollable display, the cursor is adorned with a scrolling context emblem that represents scrolling options available for that viewer. In one embodiment, the scrolling context emblem may also represent where the currently displayed portion of the content is with respect to the entire content.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the principles described herein provide efficient mechanisms for allowing a user to scroll through a displayed viewer, and also mechanism for providing a user scrolling context of the viewer even when not engaged in a scrolling operation. First, a general computing system will be described with respect to FIG. 1. Then, various embodiments of the scrolling will be described with respect to FIGS. 2 through 11.

Figure 1:
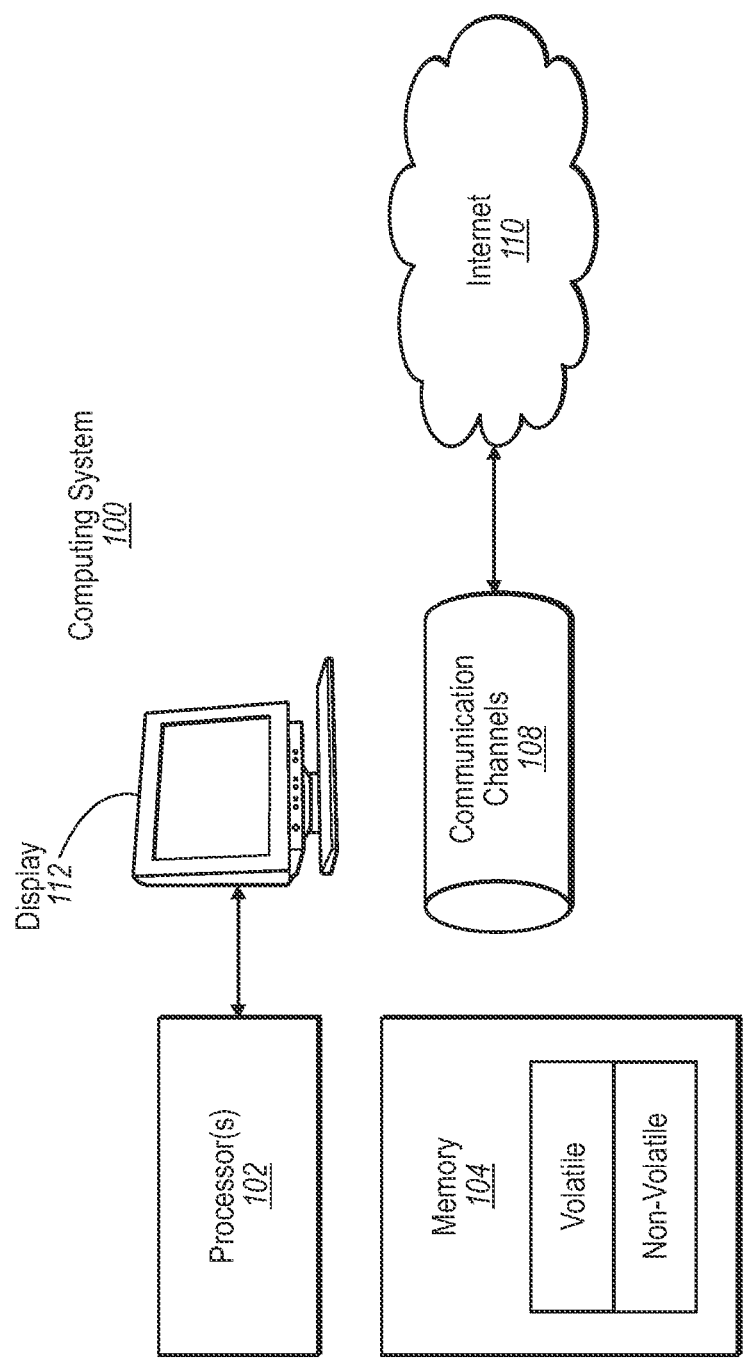
FIG. 1 illustrates a computing system that may implement one or more features described herein.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Another example of such an operation is the display of information and interfaces on the display 112.

Computing system 100 may also contain communication channels 108 that allow the computing system 100 to communicate with other message processors over, for example, network 110 (such as perhaps the Internet). Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
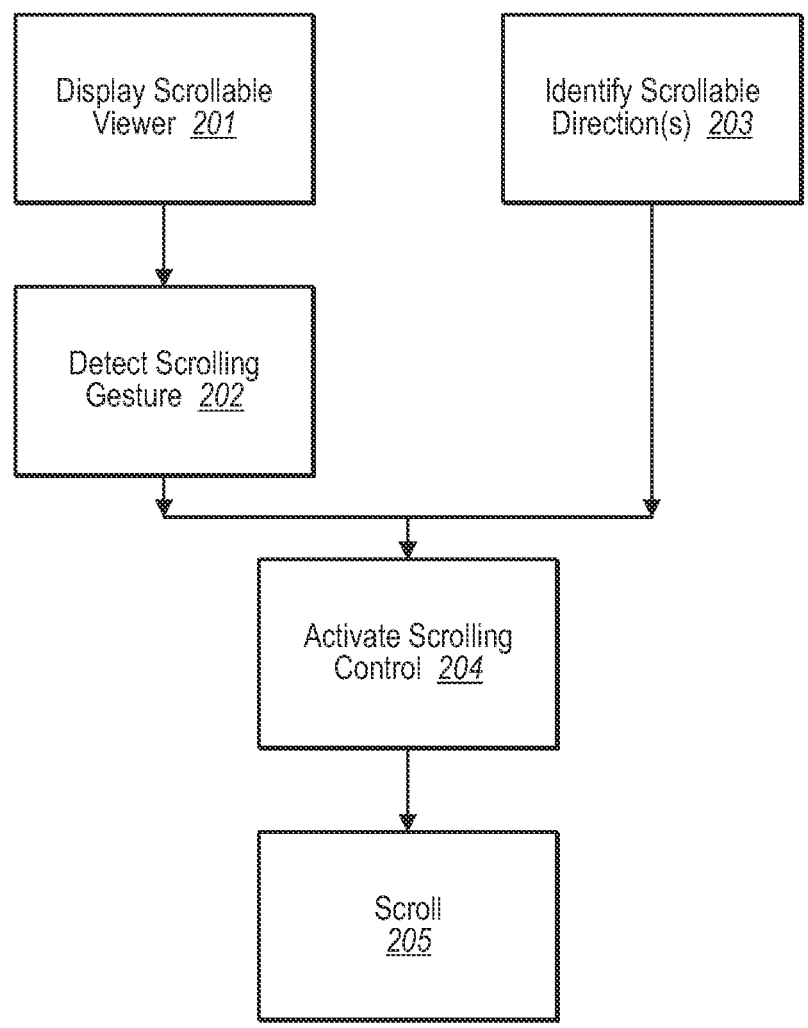
FIG. 2 illustrates a flowchart of a method for allowing a user to scroll a displayed scrollable viewer.

FIG. 2 illustrates a flowchart of a method 200 for allowing a user to scroll a displayed scrollable viewer. The method 200 will be described with respect to the user interfaces of FIGS. 3 through 7, which illustrated various embodiments of a user interface that may be manipulated using the method 200. Accordingly, the method 200 will be described with frequent reference to FIGS. 3 through 7.

The method 200 includes the displaying of a scrollable viewer (act 201). In this description a "viewer" is any component that includes visible boundaries, within which content may be displayed. A viewer may have rectangular boundaries, but may also have other shapes as well. The viewer is "scrollable" if the content displayed within the viewer may be scrolled in at least one direction. For instance, the content might be vertical scrolled, horizontally scrolled, or scrolled in some other direction. Scrolling might be most advantageous in the case where the content being displayed is larger than the current size of the viewer. However, scrolling might also be employed even if the content already fits within the viewer along the dimension of the scrollable direction.

As a side note, if a scrollable viewer has a set of one or more scrollable directions, if that viewer is resized, the set of scrollable directions might change. For instance, if a viewer is enlarged in a particular direction, the viewer might lose the scrollability in that direction as the size of the viewer in that dimension becomes larger that the size of the content in that direction. If the viewer is made smaller in a particular direction, the viewer might gain scrollability in that direction as the size of the viewer in that dimension becomes smaller than the size of the content in that direction. However, the principles described herein are not limited to embodiments in which the viewer may be resized and applies to fixed-size viewers as well.

Figure 3:
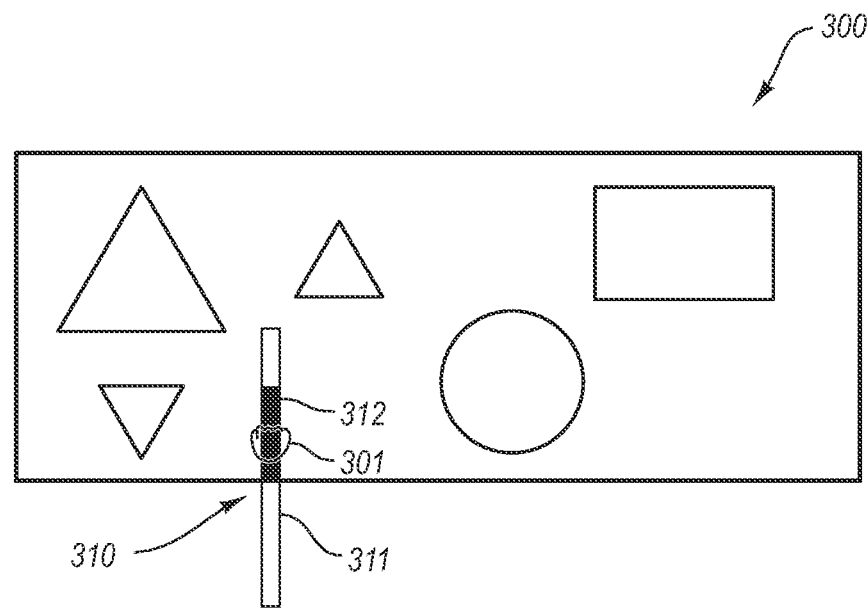
FIG. 3 illustrates a user interface that shows a viewer with a vertical scrolling control activated.

FIG. 3 illustrates a user interface example showing a scrollable viewer 300. Throughout the diagrams, the scrollable content of the viewer is shown abstractly using various shapes including triangles, circles, ellipses, rectangles, and so forth. However, this content is just shown in order to represent arbitrary content. The principles described herein apply no matter what content the viewer is displaying. As examples, the content might be a spreadsheet, a word processing document, a graphical editor, an extendible canvas, a picture, an organization chart, and so forth without limit.

Referring back to FIG. 2, while the viewer is being display, user input is detected (act 202). This user input represents a scrolling gesture that suggests a user intent to initiate scrolling. The type of user input that implies user intent to initiate scrolling will change depending on the circumstances. In one example in which a mouse is used, a vertical scrolling intent gesture is made by the user activating a selection mouse button, and dragging the mouse while the selection button is activated for at least a certain number of vertical pixel lengths (e.g., four or so). A horizontal scrolling intent gesture is made by the user activating the selection button, and dragging the mouse horizontally for a certain number of pixels. In the case of a horizontally and vertically scrollable viewer, either gesture may indicate a scrolling intent.

However, this is just one specific example of a scrolling activation gesture. Other gestures might include, for example, the activation a special selection button on the mouse, keyboard or other input device. Another activation mechanism might include the selection of multiple selection buttons on a mouse or other input device. There really is not limit on the type of input gesture. The dragging type scrolling activation gesture has some advantages in that it allows the user to activate the scrolling control, and also perform the scrolling itself in one simple continuous dragging motion.

At any point prior to the activation of the scrolling control, the set of one or more scrollable directions of the viewer is identified (act 203). In one embodiment, this identification is performed based on the dimensions of the content, as well as the dimensions of the viewer. As an example only, if the content and viewer were rectangular in two-dimensions, if the content was taller than the displayable space of the viewer, the viewer might be scrollable in the vertical direction. If the content were wider than the displayable space of the viewer, the viewer might be scrollable in the horizontal direction. However, in two-dimensional space, various forms of diagonal scrolling might also be employed. By resizing or changing some other configuration of the viewer, the set of scrollable directions may change. In addition, the scrollable directions may differ from one viewer to another depending on the viewer's size with respect to its content.

The type of scrolling control may depend on the identified scrollable directions. For instance, if the viewer is scrollable in the vertical direction, a vertical scrolling control might be activated in response to a scrolling gesture. If the viewer is scrollable in other directions as well (e.g., horizontally), perhaps there might be a distinction in the types of user input gestures that cause activation of a vertical scrolling control, and the scrolling control for the other (e.g., horizontal) direction. On the other hand, perhaps the scrolling control permits two-dimensional scrolling simultaneously, in which case only one two-dimensional scrolling control could accommodate scrolling in all directions in the viewing plane.

Upon detection of the activation gesture (act 203), the scrolling control is activated at an interior portion of the displayed viewer (act 204). This contrasts with conventional scroll bars in some significant ways. For instance, the scrolling control was only caused to appear when the scrolling control was activated by the activation gesture. Scroll bars tend to appear from the very time that scrollability of the viewer is identified, thereby occupying space in the viewer even when scrolling is not occurring. In addition, as described in conjunction with embodiments herein, the scrolling control is activated at an interior portion of the viewer, whereas scroll bars typically are at the edge of the viewer. Accordingly, less movement of the cursor is needed to manipulate the scrolling control.

In one embodiment, the scrolling control is activated at or very near the position where the cursor was at the time of scrolling control activation, thereby requiring very little, if any cursor movement in order to interface with the scrolling control. In fact, in some embodiments, the gesture used to activate the scrolling control may, with one continuous motion, lead into the actual manipulation of the scrolling control to perform scrolling. In any case, once the scrolling control is activated (act 204), whatever form that scrolling control might take, the scrolling control may then be used to perform scrolling of the viewer (act 205).

FIG. 3 illustrates the case where the viewer 300 is scrollable in the vertical direction. Here, upon detection of an appropriate user gesture, the vertical scroll control 310 is activated. In this case, the vertical scroll control includes a vertical extent 311 that represents the entire vertical range of the displayed content. The thumb 312 represents the location of the displayed content within entire vertical range of the content. The length of the thumb 312 as compared to the length of the extent 311 may represent the relative portion of the vertical range of the content that is being displayed. The thumb 312 may be moved upwards and downwards within the extent 311 to allow the displayed content to be scrolled upwards and downwards, respectively.

In this case, the vertical scrolling control is made to appear at a position such that the thumb 312 appears immediately below the cursor 301. Accordingly, suppose the activation gesture were 1) the activation of the selection button of a mouse, and 2) the dragging of the mouse a certain vertical distance with the selection button activated. In that case, when the scrolling control activates, if the user were to continue the gesture of dragging with the selection button activated, the user may proceed seamlessly into the actual vertical scrolling operation itself with the cursor 301 used to control movement of the thumb 312. This contrasts with many forms of conventional scrolling which sometimes use a combination of user inputs in order to perform scrolling.

Figure 4:
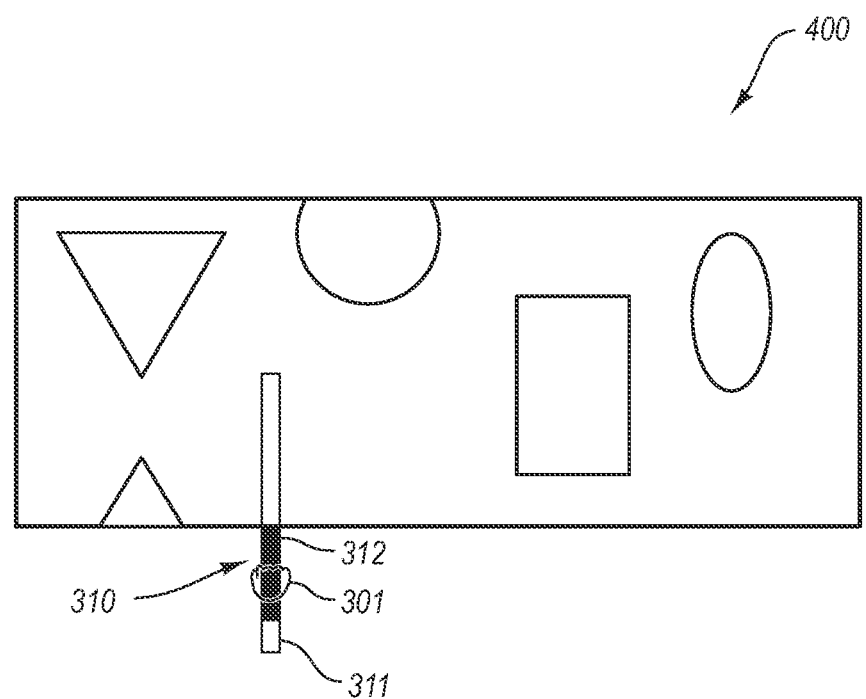
FIG. 4 illustrates the user interface of FIG. 3 in which the vertical scrolling control has been manipulated to scroll the viewer downwards.

FIG. 4 illustrates the user interface of FIG. 3 in which the vertical scrolling control has been manipulated to scroll the viewer downwards. Note that in the vertical scrolling control 310, the cursor 301 has moved the position of the thumb 312 downwards in the extent 311 as compared to its position in FIG. 3, resulting in the content of the viewer 400 being moved downwards.

Figure 5:
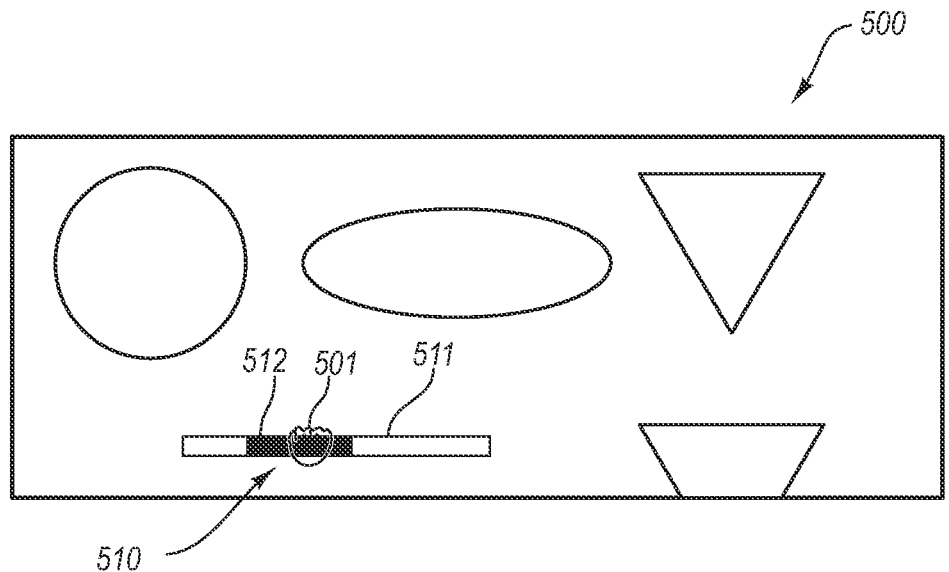
FIG. 5 illustrates a user interface that shows the viewer with a horizontal scrolling control activated.

FIG. 5 illustrates a user interface that shows the viewer 500 with a horizontal scrolling control activated. For instance, in this case, the viewer 500 is scrollable in at least the horizontal direction. If scrollable in multiple directions, different activation gestures might activate different scrolling controls. However, in one embodiment that will be described with respect to FIG. 6, in the case of the viewer being scrollable in multiple directions, a two-dimensional scrolling control may be employed instead.

In the case of FIG. 5, a horizontal scrolling control 510 has been activated through the detection of an appropriate activation gesture. The horizontal scrolling control 510 includes a horizontally-oriented extent 511 representing the horizontally scrollable range of the content, and a thumb 512 for manipulating the horizontal scrolling operation. By using the cursor 501 to move the thumb 512 left, the content is scrolled leftward. By moving the thumb 513 right, the content is scrolled rightward.

Figure 6:
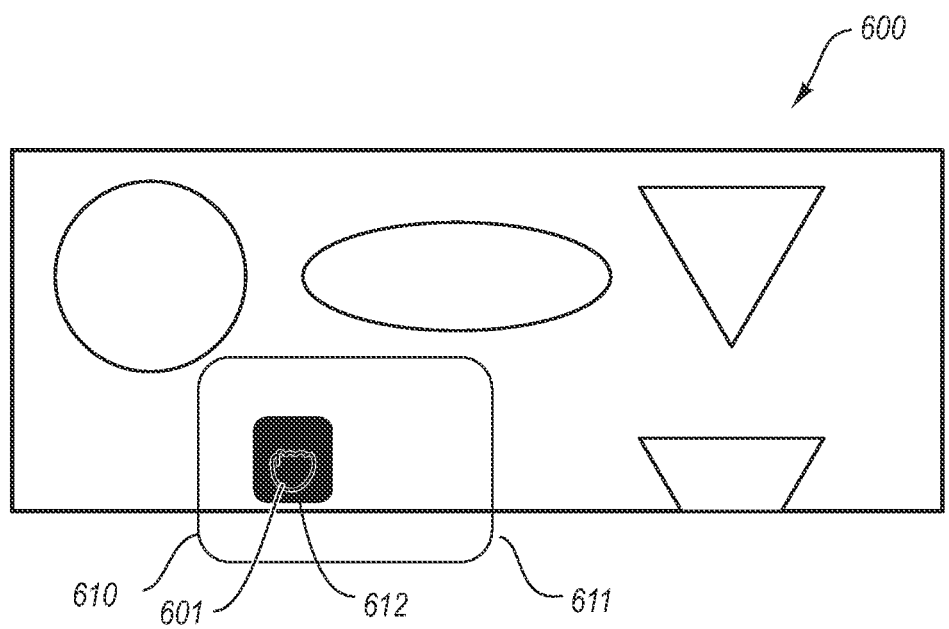
FIG. 6 illustrates a user interface that shows a horizontally and vertically scrollable viewer with a two-dimensional scrolling control activated.

FIG. 6 illustrates a user interface that shows a horizontally and vertically scrollable viewer 600 with a two-dimensional scrolling control 610 activated. Such a scrolling control 610 might appear when the viewer is scrolling in multiple directions in a two-dimensional plane (e.g., horizontally and vertically in the viewing plane). The user might scroll in any direction in that two-dimensional plane by using the cursor 601 to drag the two-dimensional thumb 612 within the two-dimensional extent 611. Accordingly, scrolling in the horizontal and vertical directions may be performed simultaneously using a single control. This two-dimensional scrolling control 610 may also be referred to herein as a scroll map, although the vertical and horizontal scrolling controls of FIGS. 4 and 5 may also be considered to be one-dimensional scroll maps since they show positional context in one dimension.

Figure 7:
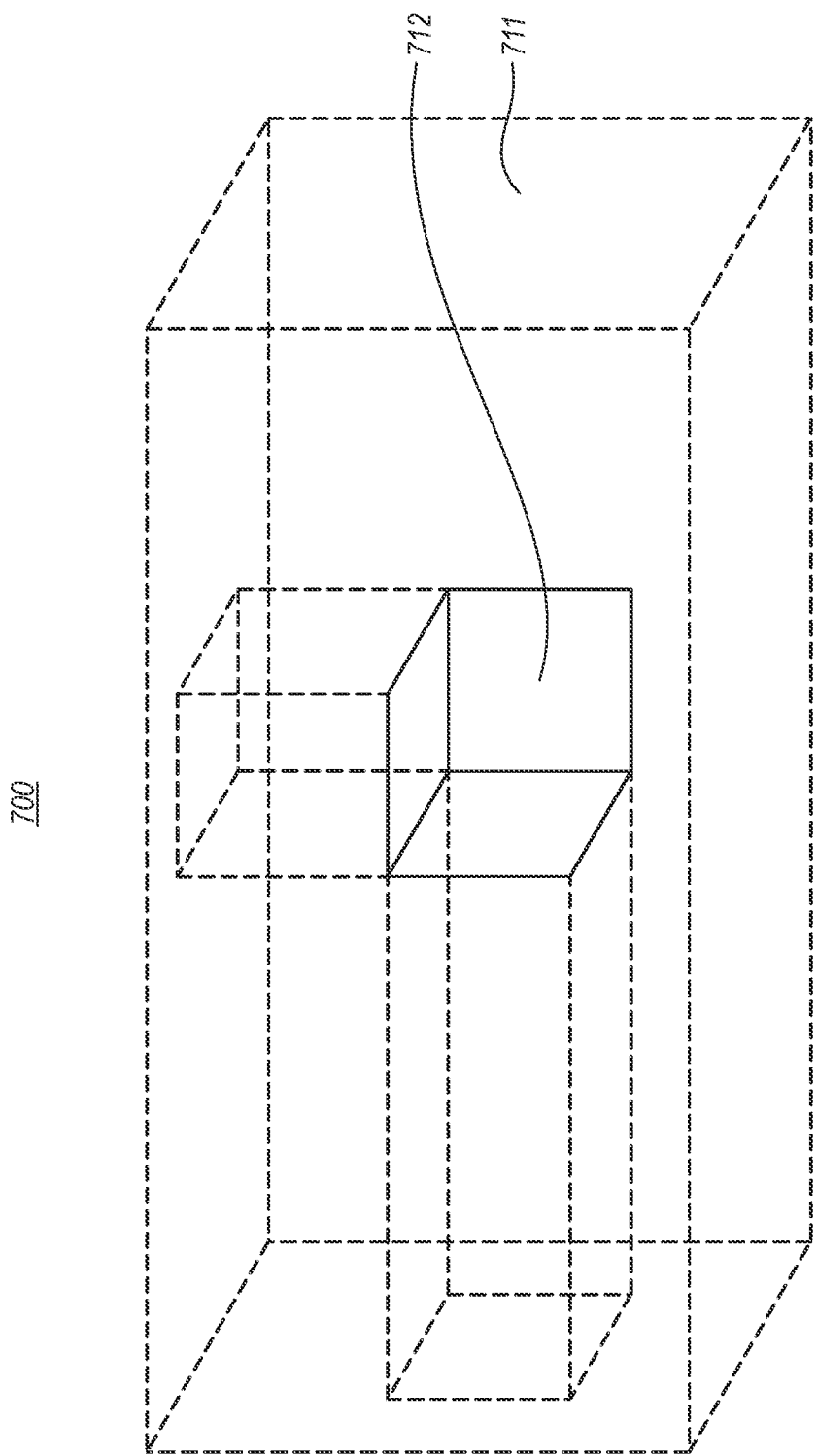
FIG. 7 illustrates a three-dimensional scrolling control that includes a three dimensional extent with a three-dimensional thumb.

The principles described herein may be extended to three-dimensional displays as well. Such three dimensional displays might include holographic displays, as well as two-dimensional displays whose content is made to appear three-dimensional. The three-dimensional viewer and three-dimensional content are not illustrated here. However, FIG. 7 illustrates a three-dimensional scrolling control 700 that may be caused to appear within or associated with three-dimensional content when a scrolling gesture is detected. The three-dimensional scrolling control 700 includes a three-dimensional extent 711 that may represent the entire three-dimensional range of the displayed content. A three-dimensional thumb 712 is shown in the extent 711 showing which portion of the three-dimensional content is currently being displayed. In one embodiment, three-dimensional content may be navigated through while only displaying a two-dimensional cross section of the current position in the three-dimensional content. In that case, a two-dimensional thumb may appear in a three-dimensional range. Furthermore, the two-dimensional thumb may be manipulated not just translationally upwards, downwards, left, right, inwards, and outwards, but may also be rotated to gain the desired cross-sectional view.

Figure 8:
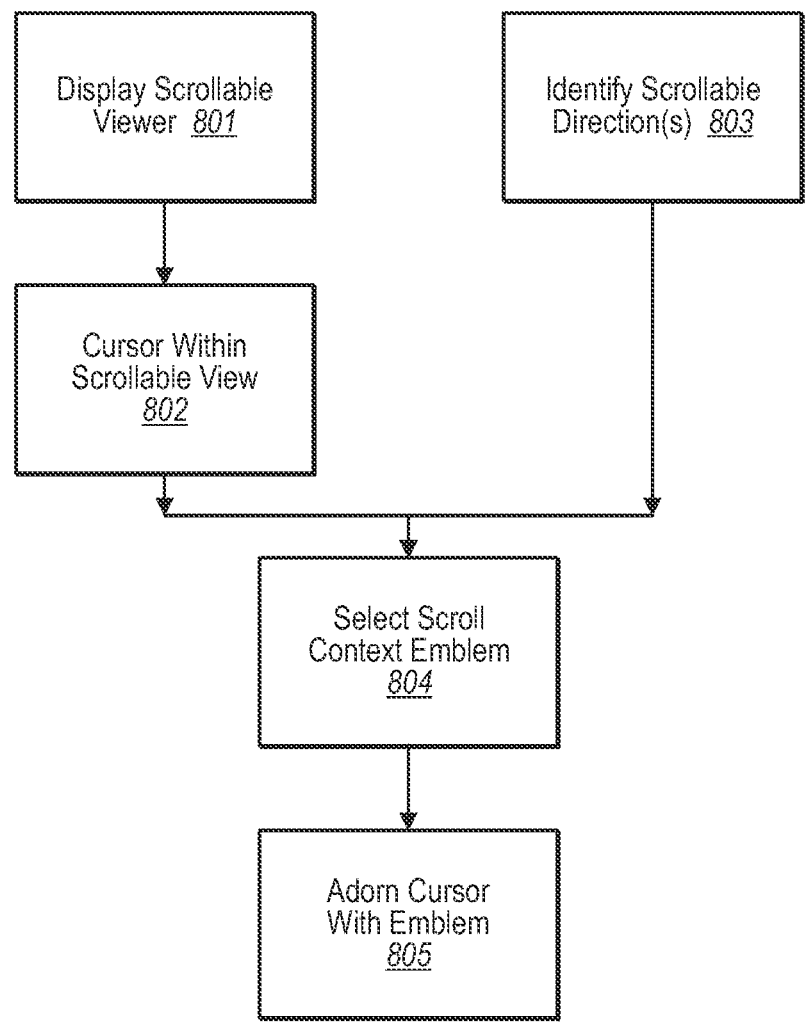
FIG. 8 illustrates a flowchart of a method for notifying the user of scrolling options and context within a displayed scrollable viewer.

Accordingly, a mechanism has been described that allows for user-friendly scrolling within various viewers. This does have the effect of increasing the number of scrolling options available to a user depending on the scrollability of the viewer itself. FIG. 8 illustrates a flowchart of a method 800 for notifying the user of scrolling options and context within a displayed scrollable viewer. Through the method, the user might have a much more intuitive understanding of the directions of scrollability in the viewer, as well as the relative current position within the entire range of the content. This is made possible by adorning the cursor with an emblem that represents the scrolling context. That emblem may move with the cursor, and may change when the scrolling context changes (i.e., when the scrolled position changes, or when the scrollable directions change).

The method 800 includes the display of a scrollable viewer (act 801). At some point while the viewer is being displayed, it is detected that the cursor is within a scrollable viewer (act 802). At some point before this cursor is adorned, the set of one or more scrollable directions of the viewer are identified (act 803). An appropriate scroll context emblem is selected based on the set of scrollable directions (act 804). Finally, the cursor is adorned with the selected emblem (act 805). In one embodiment, the adornment not only represents the scrolling directions, but also represents a position of a currently viewed portion of the viewer within the entire scrollable context of the viewer. The adornment moves with the cursor, and essentially becomes part of the cursor.

Figure 9:
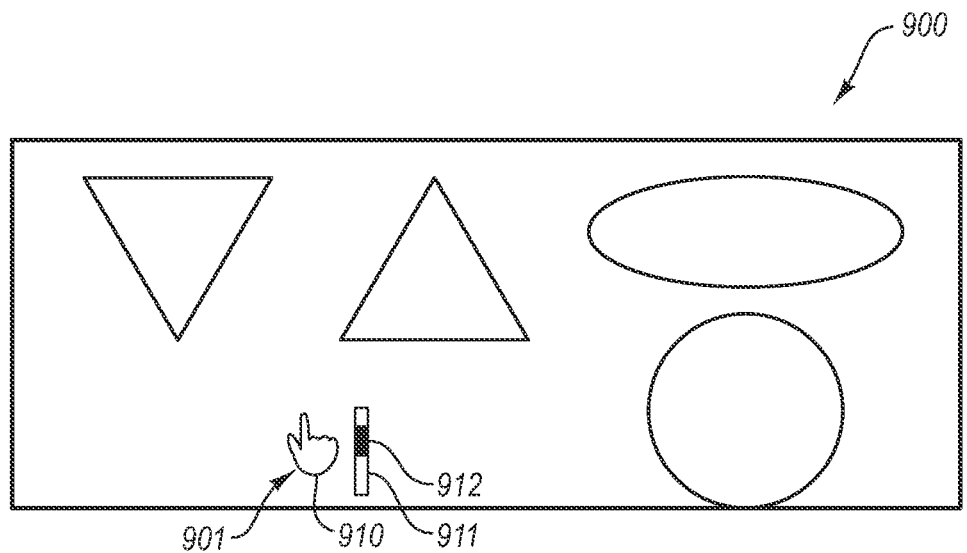
FIG. 9 illustrates a user interface with the cursor being adorned with a vertical scrolling context emblem.

FIG. 9 illustrates a user interface in which the viewer 900 has a modified cursor 901. The modified cursor includes the original cursor 910 that is adorned with a vertical scrolling context emblem. The vertical scrolling context emblem lets the user know that scrolling is possible in the vertical direction. Thus, the user might perform a vertical scrolling activation gesture so as to initiate vertical scrolling. The vertical scrolling context emblem itself does not contain a scrolling control, but it does show an extent 911 and a thumb 912, thereby letting the user know where the currently displayed content is vertically within the entire range of the content.

Figure 10:
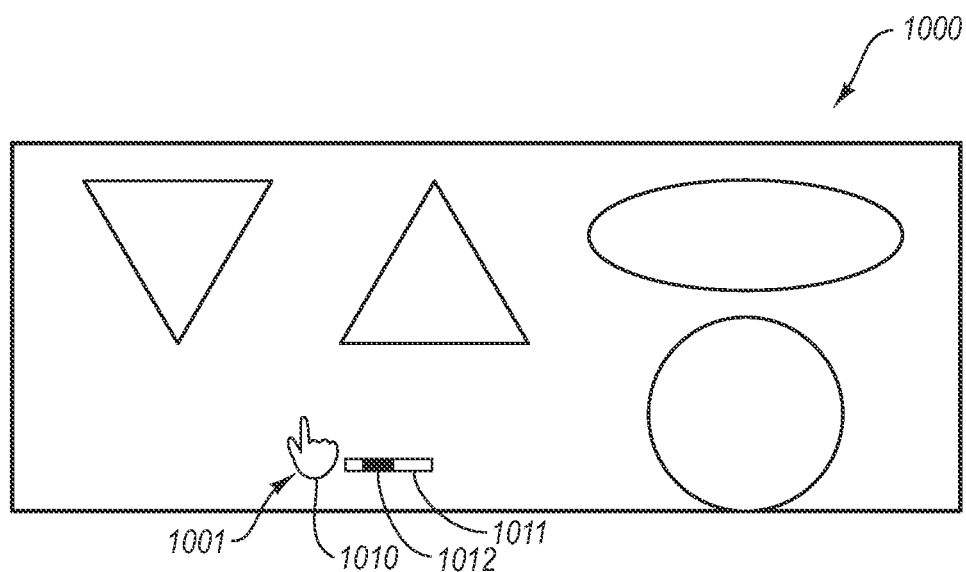
FIG. 10 illustrates a user interface with the cursor being adorned with a horizontal scrolling context emblem.

FIG. 10 illustrates a user interface in which the viewer 1000 has a modified cursor 1001 that includes the original cursor 1010 that is adorned with a horizontal scrolling context emblem. The horizontal scrolling context emblem lets the user know that scrolling is possible in the horizontal direction. Thus, the user might perform a horizontal scrolling activation gesture so as to initiate horizontal scrolling. The horizontal scrolling context emblem itself does not contain a scrolling control, but it does show a horizontal extent 1011 and a thumb 1012, thereby letting the user know where the currently displayed content is horizontally within the entire range of the content.

Figure 11:
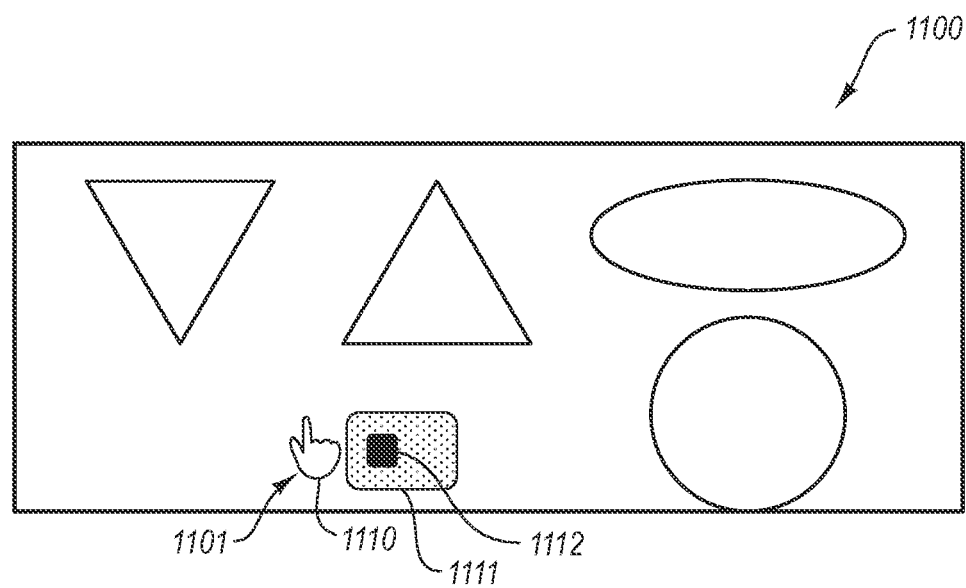
FIG. 11 illustrates a user interface with the cursor being adorned with a two-dimensional scrolling context emblem.

FIG. 11 illustrates a user interface in which the viewer 1100 has a modified cursor 1101 that includes the original cursor 1010 that is adorned with a two-dimensional scrolling context emblem. The two-dimensional scrolling context emblem lets the user know that scrolling is possible now two-dimensionally. Thus, the user might perform a scrolling activation gesture so as to initiate two-dimensional simultaneous vertical and horizontal scrolling. The two-dimensional scrolling context shows a two-dimensional extent 1111 and a two-dimensional thumb 1112, thereby letting the user know where the currently displayed content is within the entire range of the content.

As mentioned above, the principles described herein may extend to three-dimensional displays as well. In that case, if navigation is possible all three-dimensions, the cursor may be adorned with an emblem that is made to appear three dimensional, with perhaps a three dimensional thumb. For instance, the emblem might appear much as illustrated and described with respect to FIG. 7, and the accompanying description.

Accordingly, the principles described herein provide an efficient and intuitive way for a user to scroll throughout a viewer, and also provide mechanism for letting the user know what scrolling options are even when they are not scrolling. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having stored thereon one or more computer-executable instructions that are structured such that, when executed by one or more processors of a computing system, cause the computing system to perform a method for allowing a user to scroll a displayed scrollable viewer, the method comprising:

an act of displaying the scrollable viewer; and in response to a triggering event, an act of activating a scrolling control, the scrolling control overlapping with the displayed scrollable viewer and being overlaid over at least a portion of scrollable content displayed within the displayed scrollable viewer, the scrolling control comprising a three dimensional extent representing three scrollable ranges of the scrollable content, the scrolling control also including a displayed three dimensional scrolling indicator that is configured to be dragged in three dimensions within the three dimensional extent using a user input indicator, the scrolling control allowing the user to scroll the viewer in at least three scrollable directions of the scrollable viewer using the user input indicator.

2. The computer program product in accordance with claim 1, wherein the one or more computer-readable media is or are physical memory.

3. The computer program product in accordance with claim 1, wherein overlapping of the scrolling control with the displayed scrollable viewer enables both of the scrolling control and the displayed scrollable viewer to be visible where the overlapping occurs.

4. The computer program product in accordance with claim 1, wherein the scrolling control is visually presented within the interior portion of the displayed scrollable viewer, at least partially separated from a boundary edge of the displayed scrollable viewer, and so as to be completely surrounded by the displayed scrollable viewer.

5. A computer program product comprising one or more physical computer-readable storage media having thereon one or more computer-executable instructions that are structured such that, when executed by one or more processors of a computing system, cause the computing system to perform a method for notifying the user of scrolling options and context within a displayed scrollable viewer, the method comprising:
    in response to a triggering event, an act of displaying a scroll context emblem representing a position of a currently viewed portion of a scrollable viewer within the entire scrollable context of the scrollable viewer, the scroll context emblem overlapping with the scrollable viewer and being overlaid over at least a portion of scrollable content displayed within the scrollable viewer corresponding to a location of a user input indicator, the scroll context emblem representing both at least three scrollable directions, wherein the scroll context emblem comprises a three-dimensional extent representing the entire three-dimensional range of the scrollable viewer, and wherein the scroll context emblem includes a scrolling indicator positioned therein that represents an appropriate position of a currently displayed portion of the scrollable content displayed in the scrollable viewer within an entire range of the scrollable viewer and that is configured to be dragged in three dimensions within the three-dimensional extent using the user input indicator to scroll the scrollable content.

6. A computer program product in accordance with claim 5, the method further comprising:
    an act of detecting that a size of the scrollable viewer has changed;
    subsequent to the act of detecting that the size of the scrollable viewer has changed, an act of detecting that the user input indicator has been navigated into the scrollable viewer having the changed size;
    in response to the act of detecting that the user input indicator has been navigated into the scrollable viewer having the changed size, an act of identifying one or more scrollable directions possible for the scrollable viewer that the user input indicator is within based on the changed size; and
    an act of selecting one of a plurality of possible scroll context emblem types to adorn the user input indicator with depending on the identified one or more scrollable directions.

7. A computer program product in accordance with claim 6, wherein the act of identifying identifies only a horizontal scrollable direction, wherein the selected emblem comprises an extent oriented horizontally, and having a scrolling indicator positioned therein that represents a position of a currently displayed portion of the scrollable viewer within an entire range of the scrollable viewer.

8. A computer program product in accordance with claim 6, wherein the act of identifying identifies only a vertical scrollable direction, wherein the selected emblem comprises an extent oriented vertically, and having a scrolling indicator positioned therein that represents an appropriate position of a currently displayed portion of the scrollable viewer within an entire range of the scrollable viewer.

9. A computer program product in accordance with claim 6, wherein the act of identifying identifies both a vertical and a horizontal scrollable direction, wherein the selected emblem comprises a two-dimensional extent representing the entire two-dimensional range of the scrollable viewer, and includes a scrolling indicator positioned therein that represents a position of a currently displayed portion of the scrollable viewer within an entire range of the scrollable viewer.

10. A computer program product in accordance with claim 5, wherein the scroll context emblem moves with the user input indicator at least temporarily.

11. A method, implemented at a computer system that includes one or more processors, at least one user input device, and a least one display device, for allowing a user to scroll a displayed scrollable viewer, the method comprising:
    an act of displaying the scrollable viewer; and
    in response to a triggering event, an act of activating a scrolling control, the scrolling control overlapping with the displayed scrollable viewer and being overlaid over at least a portion of scrollable content displayed within the displayed scrollable viewer, the scrolling control comprising a three dimensional extent representing three scrollable ranges of the scrollable content, the scrolling control also including a displayed three dimensional scrolling indicator that is configured to be dragged in three dimensions within the three dimensional extent using a user input indicator, the scrolling control allowing the user to scroll the viewer in at least three scrollable directions of the scrollable viewer using the user input indicator.

12. The method in accordance with claim 11, wherein the triggering event comprises an act of detecting user input during the act of displaying the scrollable viewer, the user input corresponding to a user input indicator position at an interior portion within the displayed scrollable viewer.

13. The method in accordance with claim 11, wherein overlapping of the scrolling control with the displayed scrollable viewer enables both of the scrolling control and the displayed scrollable viewer to be visible where the overlapping occurs.

14. The method in accordance with claim 11, wherein the scrolling control is visually presented within the interior portion of the displayed scrollable viewer, at least partially separated from a boundary edge of the displayed scrollable viewer, and so as to be completely surrounded by the displayed scrollable viewer.

15. The method in accordance with claim 11, wherein the user input indicator comprises a cursor.

* * * * *